United States Patent [19]

Theakston

[11] 4,362,025
[45] Dec. 7, 1982

[54] SOLAR POWERED REFRIGERATION APPARATUS

[75] Inventor: Franklyn H. Theakston, Guelph, Canada

[73] Assignee: The Guelph Manufacturing Group Ltd., Guelph, Canada

[21] Appl. No.: 238,595

[22] Filed: Feb. 26, 1981

[30] Foreign Application Priority Data

Sep. 16, 1980 [CA] Canada .................................. 360351

[51] Int. Cl.³ .......................................... F25B 15/00
[52] U.S. Cl. .................................... 62/148; 62/235.1; 62/238.3; 62/476; 165/48 S; 165/104.21
[58] Field of Search ....................... 62/235.1, 148, 119, 62/476, 238.3; 165/48 S, 104.21

[56] References Cited

U.S. PATENT DOCUMENTS

| 3,105,363 | 10/1963 | Von Der Scher | 62/148 |
| 4,100,756 | 7/1978 | Albertson | 62/235.1 |
| 4,119,085 | 10/1978 | Knowles et al. | 165/104.21 X |
| 4,126,014 | 11/1978 | Kay | 62/235.1 |
| 4,164,128 | 8/1979 | Newton | 62/105 |
| 4,184,338 | 1/1980 | Bennett | 62/235.1 |
| 4,207,744 | 6/1980 | Takeshita et al. | 62/235.1 |
| 4,220,138 | 9/1980 | Bottum | 126/433 |
| 4,246,762 | 1/1981 | Bourne | 62/476 |
| 4,251,997 | 2/1981 | Newton | 62/101 |

FOREIGN PATENT DOCUMENTS 1055701 6/1979 Canada .

Primary Examiner—Lloyd L. King
Attorney, Agent, or Firm—Moss, Bensette, Thompson, Squires

[57] ABSTRACT

Solar powered refrigeration apparatus is disclosed in which an absorption refrigeration system is operated directly by solar energy. One end of a heat pipe is thermally connected to the boiler of the absorption refrigeration system, and a solar collector is thermally coupled to the other remote end of the heat pipe. The heat pipe is a sealed, evacuated metal tube partially filled with water. The solar collector is a double walled glass vacuum tube with a central axial opening for accommodating the remote end of the heat pipe. Heat energy collected by the solar collector boils the water in the heat pipe to subsequently condense in the area of the boiler thus transferring heat energy along the heat pipe to the boiler. The heat pipe is installed sloping downwardly away from the boiler to permit the return of condensate down the pipe to the solar collector area thus permitting continuous operation.

11 Claims, 4 Drawing Figures

SOLAR POWERED REFRIGERATION APPARATUS

BACKGROUND OF THE INVENTION

This invention relates to refrigeration apparatus, and in particular to absorption refrigeration apparatus and the use of solar energy to power same.

There are two main types of refrigeration apparatus commonly in use today. The most frequently encountered apparatus or refrigeration system includes the following elements coupled in seriatim in a refrigerant circuit: a compressor, a condenser, an expansion valve and an evaporator coil. Compressed liquid refrigerant passes through the expansion valve to be vaporized in the evaporator coil. Heat is absorbed by the refrigerant in the evaporator coil as the refrigerant vaporizes, and the heat is subsequently dissipated in the condenser where the vaporized refrigerant is again liquified. This type of refrigeration system may be operated in a reverse cycle, in which case it is called a heat pump. In a heat pump, in effect, the condenser and evaporator coil switch roles, so the heat is absorbed at the location of the condenser and heat is dissipated at the location of the evaporator coil.

The other main type of refrigeration apparatus is the absorption system, in which case no compressor is used. In the absorption system, briefly, a boiler is used to vaporize and motivate the refrigerant, which then passes through a condenser. Liquid refrigerant from the condenser passes through an evaporator/temperature exchanger where the refrigerant vaporizes to absorb heat energy. The vaporized refrigerant is then converted back to the desired liquid state to re-enter the boiler where heat energy applied to the boiler again vaporizes the refrigerant to repeat the cycle.

In the compressor type refrigeration system first described above, it is desirable to add external heat energy to the system where the system is a heat pump and is operated in the reverse mode described above. It has been proposed in the past to use solar collectors to make use of solar energy in the heat pump system. However, this solar energy has only been used indirectly, and usually through intermediate heat exchangers, to improve the efficiency of the heat pump which still must employ a compressor for operation.

SUMMARY OF THE INVENTION

The present invention is concerned with the absorption refrigeration system, wherein heat energy input alone is the prime mover or operative element. The present invention uses a solar collector and a heat pipe thermally and directly coupled to a boiler of the absorption system to supply the required heat energy to operate this system where solar energy is available.

According to the invention, there is provided solar powered refrigeration apparatus comprising an absorption refrigeration system having a boiler for input of heat energy thereto. A heat pipe is thermally connected to the boiler for transferring heat from a remote location to the boiler. Also, a solar collector is thermally coupled to the heat pipe at the remote location. The solar collector includes means for accumulating solar energy to heat the heat pipe to a temperature sufficient to operate the boiler.

BRIEF DESCRIPTION OF THE DRAWINGS

In the following description of the preferred embodiment of the invention reference is made to the accompanying drawings, in which.

DETAILED DESCRIPTION OF THE PREFERRED EMBODIMENT

Figures 1, 2, 3, 4:
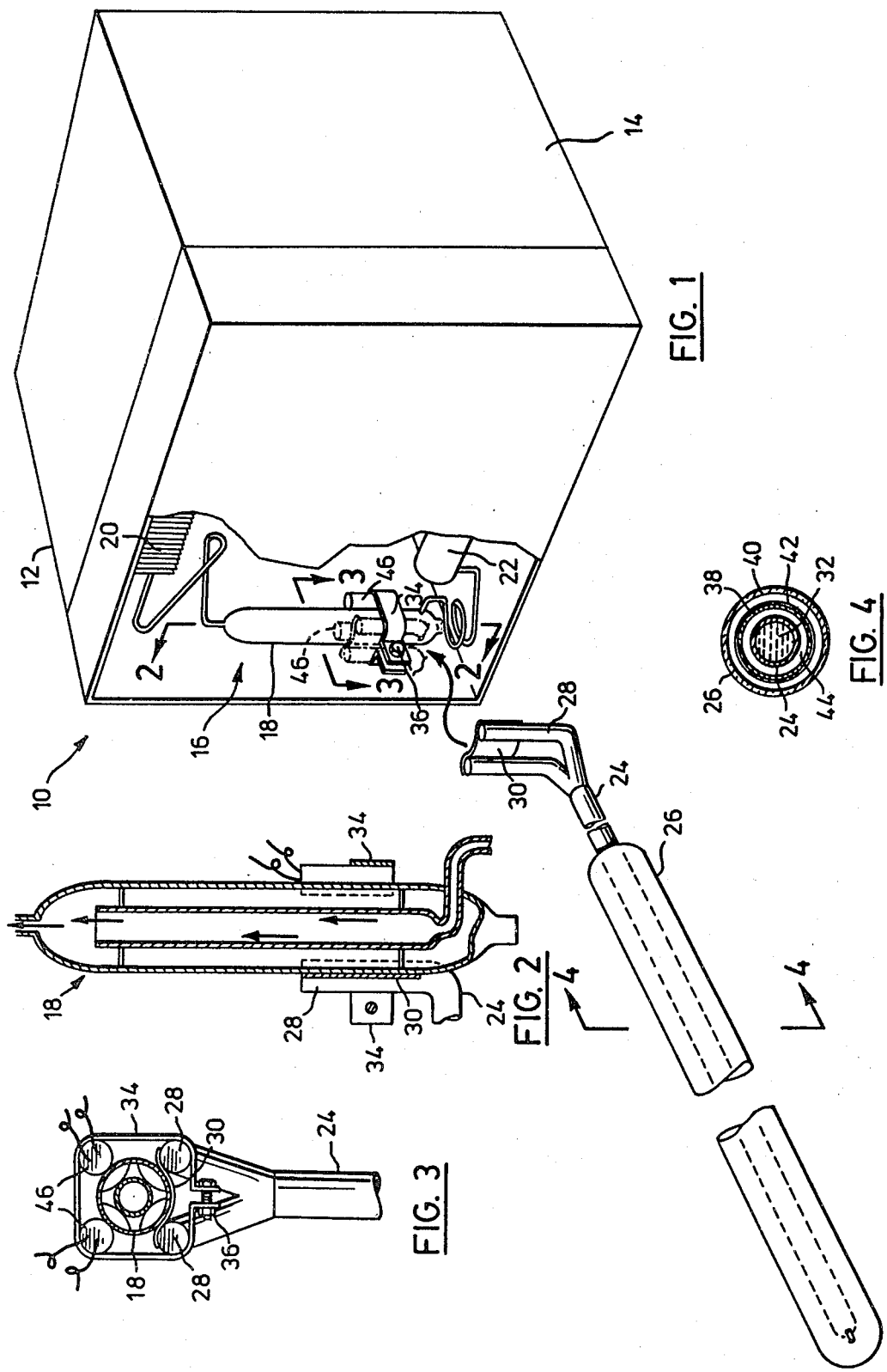
FIG. 1 is a perspective view, partly broken away and exploded, showing the preferred embodiment of the solar powered refrigeration apparatus of the present invention as applied to an absorption type refrigerator.
FIG. 2 is a sectional view of the boiler of the apparatus of FIG. 1 taken along lines 2—2 of FIG. 1.
FIG. 3 is a cross-sectional view taken along lines 3—3 of FIG. 1.
FIG. 4 is a cross-sectional view of the heat exchanger and heat pipe taken along lines 4—4 of FIG. 1.

Referring to the drawings, a preferred embodiment of a solar powered refrigeration unit according to the present invention is generally indicated by reference numberal 10. Refrigeration unit 10 includes a refrigerator 12 which is viewed from the rear in FIG. 1. Refrigeration 12 includes a cold box 14 and an absorption refrigeration system 16, part of which is visible where the rear of the housing or cabinet of refrigerator 12 is broken away in FIG. 1. The portion of the absorption refrigeration system 16 visible in FIG. 1 includes a boiler 18, a condenser 20, and an absorber vessel 22. The actual absorption refrigeration system 16 used in refrigeration unit 10 is conventional, as is the remainder of refrigerator 12, so these items will not be described in further detail in the present specification. However, the collection and application of solar energy to boiler 18 will be described in further detail below.

Solar powered refrigeration unit 10 also includes a heat pipe 24 and a solar collector 26. Heat pipe 24 is thermally connected to boiler 18 and solar collector 26 is thermally coupled to heat pipe 24 at a location which is considered to be remote from the boiler of refrigerator 12.

Heat pipe 24 is formed of a copper tube ½ inch to ¾ inch in diameter and approximately 4 feet in length. One end portion of heat pipe 24 is bifurcated to form an upstanding Y or fork 28. A curved plate 30 is connected between the two branches of fork 28 and is shaped to conform to the curvature of boiler 18 as seen best in FIG. 3 to improve the heat conduction between heat pipe 24 and booiler 18. Both ends of heat pipe 24 (including each branch of fork 28) are hermetically sealed. However, before these ends are sealed, the tube is filled with distilled water 32 so that the amount of water in heat pipe 24 is more than one-third of the volume of the tube forming the heat pipe and less than the full volume of the tube. Heat pipe 24 is also evacuated to approximately −32 pounds per square inch absolute at room temperature prior to sealing the ends. Heat pipe 24 is connected to boiler 18 using a surrounding strap or clamp 34 which is tightened by threaded fastener 36 to ensure good thermal contact between heat pipe 24 and boiler 18.

Solar collector 26 is a double walled glass vacuum tube having an inner wall 38 and an outer wall 40. As seen best in FIG. 4, the surface of inner wall 38 next to outer wall 40 is coated with an energy absorbing coating 42. Outer wall 40 is transparent and the space between inner and outer walls 38, 40 is evacuated, so that solar heat energy is collected or trapped inside solar collector 26 to be transferred to heat pipe 24. It will be apparent from FIG. 4 that heat pipe 24 is located in a central axial opening 44 in solar collector 26. Solar collector 26 is approximately 2 inches in diameter and 3 to 4 feet in length. A preferred form of solar collector 26 is sold by Owens Illinois Inc. of Toledo, Ohio, United States of America under the trade mark SUN-PAK. Such solar collectors are capable of producing interior temperatures in excess of 600 degrees F. in bright sunlight. However, solar collector 26 typically heats heat pipe 24 so that the bifurcated end connection to boiler 18 is at or above 270 degrees F., which is entirely adequate to operate refrigeration unit 10.

Heat pipe 24 is installed in refrigeration unit 10 so that it is downwardly and outwardly inclined away from boiler 16 with a slope of approximately 5 to 10 degrees from horizontal. This facilitates the operation of the heat pipe, as described below. In a typical installation, refrigerator 12 would be located indoors, heat pipe 24 would pass through an exterior wall to a remote location outdoors, and solar collector 26 would be mounted on the remote or exterior end portion of heat pipe 24 in a location for maximum exposure to sunlight.

In operation, sunlight impinging on solar collector 26 heats the remote end of heat pipe 24 located therein to boil or vaporize water 32 located inside heat pipe 24. This water vapor or steam travels upwardly along the length of heat pipe 24 to fork 28 where it condenses to give off heat energy. The condensed steam or water than runs back down heat pipe 24 to the area of solar collector 26 where it is again vaporized. In this way, heat is transferred along heat pipe 24 from the remote solar collector area to where it is applied to boiler 18 to operate the absorption refrigeration system 16.

In the event that solar collector 26 produces more solar heat energy than is required to operate refrigeration unit 10, the water 32 inside heat pipe 24 eventually will all vaporize or the heat pipe will be heated to a uniform temperature along its length. In this case, the heat transfer from the solar collector area along the heat pipe to boiler 18 will cease, but the end portion of heat pipe 24 in contact with boiler 18 will still be hot enough to operate refrigeration system 16. It will be appreciated, therefore, that heat pipe 24 provides a limiting action whereby it is not possible to apply excess solar heat energy to boiler 18. In effect, this acts as a thermostat and prevents excess heat energy being applied to the boiler which could produce deleterious results. When the heat energy produced by solar collector 26 subsequently decreases, a temperature gradient along the length of heat pipe 24 will again be produced, in which case the heat pipe again functions to transfer heat energy from the solar collector area to boiler 18.

Refrigerator 12 also includes a pair of auxiliary heating elements 46 which are electrically powered to operate refrigeration system 16 in the event that there is no solar energy available for that purpose. If desired, a thermostatic control could be connected to heating elements 46 to automatically activate these heating elements if the heat input provided by the heat pipe 24 is insufficient to operate refrigeration system 16. In the preferred embodiment, the temperature of the heat pipe or the auxiliary heating means at the boiler should be above 270 degrees F. for most efficient operation.

Having described the preferred embodiment of the invention, it will be appreciated that various modifications may be made to the structure described. For example, a second heat pipe 24 and solar collector 26 could be used to provide heat to boiler 18, if one solar collector is insufficient to supply sufficient heat energy due to geographical location. The heat pipe and the solar collector shown in the drawings are of indeterminate length. It will be apparent that the dimensions could be varied to suit the particular application. It will also be apparent that other types of heat pipes and other types of solar collectors could be used in the present invention. Further, the solar powered refrigeration apparatus of this invention does not have to be applied to a refrigerator. It could be applied to other types of refrigeration apparatus, such as a walk-in freezer or the like.

From the above, it will be apparent that this invention provides a very simple but effective solar powered refrigeration apparatus, wherein solar energy is directly applied to and is the sole source of energy to operate the refrigeration apparatus providing there is sunlight available for this purpose. In the event that there is no sunlight to operate the refrigeration apparatus, then auxiliary heating elements are provided to operate the apparatus until sunlight is available.

What I claim is:

1. Solar powered refrigeration apparatus comprising: an absorption refrigeration system having a boiler for input of heat energy thereto; a heat pipe thermally connected to the boiler for transferring heat energy from a remote location to the boiler, the heat pipe being downwardly inclined away from the boiler and having an upstanding end portion in thermal contact with the boiler, said end portion being disposed parallel to the boiler; a solar collector thermally coupled to the heat pipe at said remote location, the solar collector being a double walled glass vacuum tube having inner and outer walls and a central axial opening for accommodating the heat pipe, the solar collector being dimensioned to heat the heat pipe above 270° F. at said upstanding end portion when the solar collector is exposed to sunlight.

2. Solar powered refrigeration apparatus as claimed in claim 1 wherein the upstanding end portion of the heat pipe is bifurcated having two parallel branches in thermal contact with the boiler.

3. Solar powered refrigeration apparatus as claimed in claim 2 wherein the bifurcated upstanding end portion of the heat pipe further includes a curved plate extending between the branches of the end portion, the curvature of the plate conforming to the curvature of the boiler.

4. Solar powered refrigeration apparatus as claimed in claim 1 wherein the heat pipe comprises a sealed metal tube partially filled with water.

5. Solar powered refrigeration apparatus as claimed in claim 4 wherein the volume of water in the metal tube is more than one-third of the volume of the tube and less than the full volume of the tube.

6. Solar powered refrigeration apparatus as claimed in claim 5 wherein said partially filled tube is evacuated to a pressure of −32 pounds per square inch absolute at room temperature.

7. Solar powered refrigeration apparatus as claimed in claim 6 wherein the water is distilled water.

8. Solar powered refrigeration apparatus as claimed in claim 1 wherein the solar collector inner wall is coated with an energy absorbing coating.

9. Solar powered refrigeration apparatus as claimed in claim 1 wherein said heat pipe and solar collector are a first heat pipe and solar collector, and further comprising a second identical heat pipe and solar collector thermally connected to the boiler in addition to and in the same manner as the first heat pipe and solar collector.

10. Solar powered refrigeration apparatus as claimed in claim 1 and further comprising auxiliary heating means coupled to the boiler.

11. Solar powered refrigeration apparatus as claimed in claim 10 and further comprising thermostatic means operably coupled between the auxiliary heating means and the boiler to activate the auxiliary heating means when the temperature of the heat pipe at the boiler is below 270° F.

* * * * *